Figure 1:
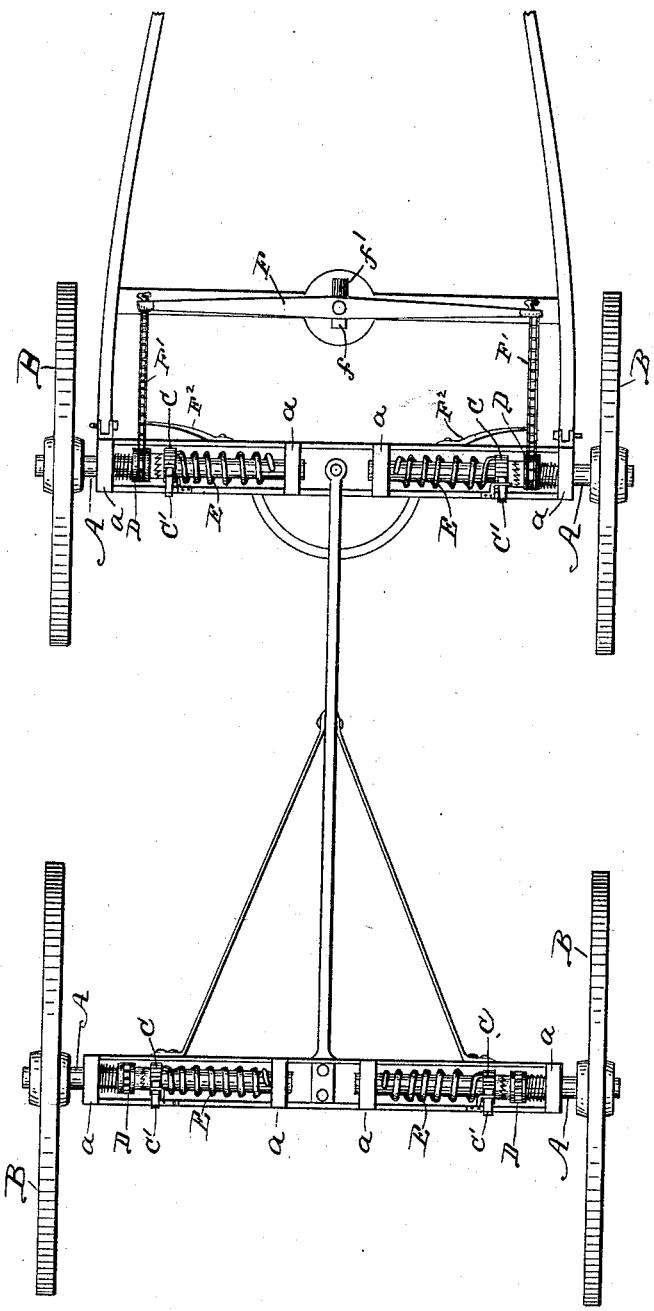

(No Model.)

T. H. PAESSLER.
DRAFT DEVICE FOR VEHICLES.

No. 331,156. Patented Nov. 24, 1885.

WITNESSES:
Thos. Houghton.
P. B. Turpin.

INVENTOR:
T. H. Paessler
BY Munn & Co.
ATTORNEYS.

(No Model.)  
2 Sheets—Sheet 2.
T. H. PAESSLER.
DRAFT DEVICE FOR VEHICLES.
No. 331,156. Patented Nov. 24, 1885.
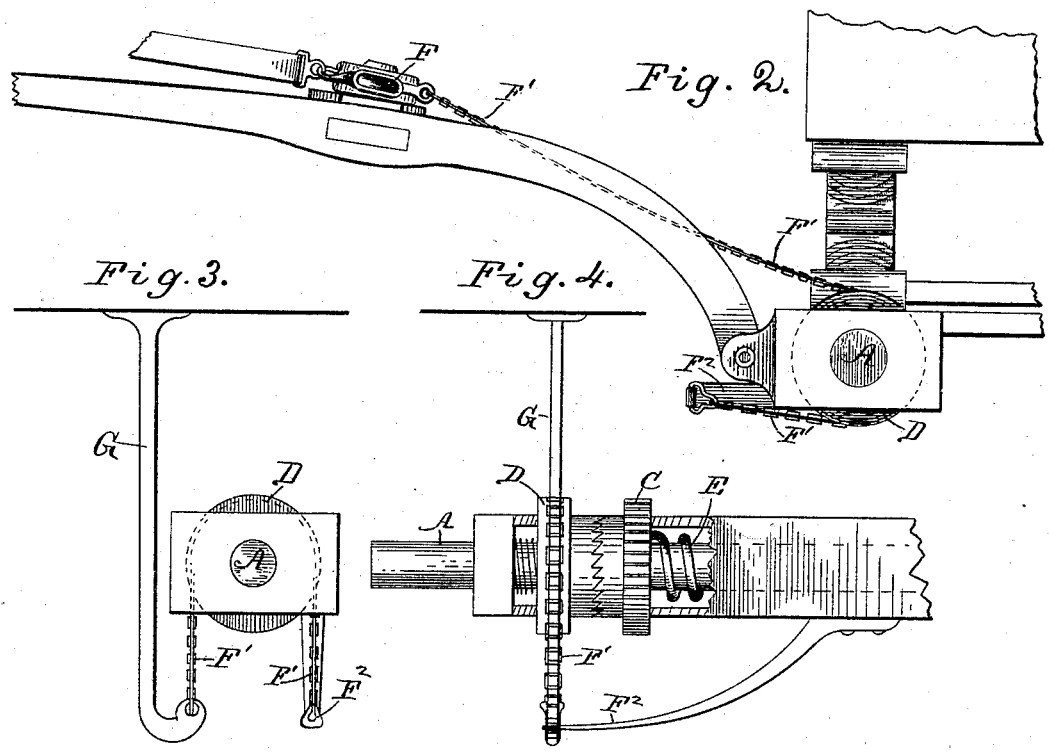
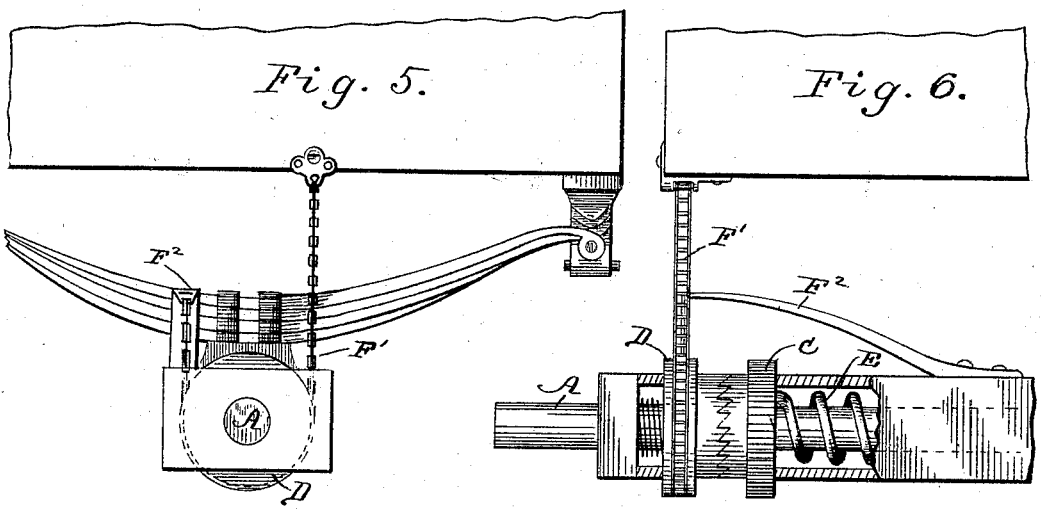
WITNESSES:  
Thos. Houghton.  
P. B. Turpin.
INVENTOR:  
T. H. Paessler  
BY Munn & Co.  
ATTORNEYS.

UNITED STATES PATENT OFFICE.

THEOPHILUS H. PAESSLER, OF MALVERN, OHIO.

DRAFT DEVICE FOR VEHICLES.

SPECIFICATION forming part of Letters Patent No. 331,156, dated November 24, 1885.

Application filed September 17, 1885. Serial No. 177,395. (No model.)

*To all whom it may concern:*

Be it known that I, THEOPHILUS H. PAESSLER, a citizen of the United States, residing at Malvern, in the county of Carroll and State of Ohio, have invented a new and useful Improvement in Devices for Assisting Draft, of which the following is a description.

This invention is an improvement in devices for assisting the draft of vehicles and carriages of all kinds by utilizing the jars of draft and the jolting of such carriages to accumulate power on the axle in order to give such part a forward impulse.

My invention, as before stated, is applicable to all varieties of wheeled vehicles or carriages, from wheel-plows to bicycles, as will be readily understood from the following description.

The invention consists in certain novel constructions and combinations of parts, as will be hereinafter first fully described, and then pointed out in the claims.

In the drawings, Figure 1 is a plan view of the running-gear of a wagon provided with my improvement. Fig. 2 is a side view of the forward end of such gear, the wheel being removed; and Figs. 3, 4, 5, and 6 are detail views illustrating the manner of applying the invention to the rear wheels.

In carrying out my invention I provide a pair of stub-axles, A A, to each of which the wheels B are fixed. These axles A A may be journaled in bearings $a\,a$, as shown. On each axle I place a ratchet-wheel, C, having peripheral teeth to be engaged by the stop-pawl C', and edge teeth, by which it engages with what for convenience of reference I term a "second wheel," D. This wheel may be also placed on the axle, and it is preferably provided with peripheral cog-teeth, for the purposes presently described.

On the axle is coiled a spring, E, one end of which is fixed to the axle, and its other end is secured to the ratchet-wheel. The whiffletree F is pivoted in advance of the forward axle, and preferably in a slot, $f$, the forward end of which is supplied with a spring, $f'$, by which to ease the forward motion of the whiffletree, as will be understood. From each end of the whiffletree a connection or cog-band, F', passes back around the wheel D, and is secured at its rear end to a spring, $F^2$, supported by the framing.

In operation the motion of the whiffletree will draw connection F' forward, which by engagement with wheel D will turn such wheel. The revolution of wheel D by its engagement with wheel C will turn such wheel and contract the spring. The stop-pawl will hold the ratchet-wheel at the point to which it is moved by wheel D, and the axle is given a forward impulse by the action of the spring seeking to relax itself. The spring $F^2$ returns the connection F' when the draft thereon is released by the stepping of the horse or other cessation of the draft. This back-and-forward motion of the connections alternately tightens and permits the spring to impart a forward motion to the axle.

Instead of connecting the second wheel with the framing through the medium of the whiffletree, as is preferred, such connection might be effected, as shown in Figs. 3, 4, 5, and 6, with the body or platform.

In the construction shown in Figs. 3 and 4 a rod, G, depends from the body, and the cog-chain is connected at one end with the said rod, and is passed over the cog-wheel and connected at its other end with the spring. In the construction shown in Figs. 5 and 6 the cog-chain is connected at one end to the body or bed, and passes thence under the cog or second wheel and is secured to the spring. In both these constructions the operation of the second wheel depends on jars or jolts to depress the body or bed, which in rising will revolve the second wheel by the connection therewith, as described.

Many modifications might be made without departing from the broad principles of my invention. The connection with the framing might be made at different points than the whiffletree or the platform, and instead of the "second wheel," so called, the connection with the framing might be directly with the ratchet-wheel.

Manifestly the application of my invention to bicycles, tricycles, wheel-plows, and the like could be easily effected and would involve simply mechanical skill.

The wheels, it will be understood, should be fixed on the axles. This may be accomplished by forming them integral with or keying them on the axles in any suitable manner.

Having thus described my invention, what I claim as new is—

1. The combination, with an axle and a wheel fixed thereon, of a ratchet-wheel, a spring connected at one end with the axle and at its other end with the ratchet-wheel, a stop-pawl arranged to engage the ratchet-wheel, and a connection between said ratchet-wheel and the framing, whereby said wheel may be revolved and the spring be tightened, substantially as set forth.

2. In combination with an axle and a wheel fixed thereto, a ratchet-wheel, a spring connected at one end with the axle and at its other end with the ratchet-wheel, a stop-pawl adapted to engage the ratchet-wheel, a second wheel arranged to engage the ratchet-wheel, and an operating connection engaged with the said second wheel, substantially as set forth.

3. The combination of the axle, the wheel fixed thereto, the ratchet-wheel on said axle, the spring secured at one end to the ratchet-wheel and at the other end to the axle, a stop-pawl, a second wheel adapted to engage the ratchet-wheel, and connections between said second wheel and the framing, substantially as set forth.

4. The improved draft-assisting mechanism herein described, consisting of the axle, the wheel fixed thereto, a ratchet-wheel and spring on said axle, a stop-pawl, a second wheel arranged to engage the ratchet-wheel, the whiffletree, and a connection between the whiffletree and the said second wheel, substantially as set forth.

5. The combination of the pair of axles, the whiffletree, the springs, stop-pawls, ratchet, and second wheels, and the connections between the second wheels and the whiffletree, substantially as set forth.

THEOPHILUS H. PAESSLER.

Witnesses:
N. H. DICKEY,
J. G. MURDOCK.